(12) United States Patent
Gillespie et al.

(10) Patent No.: US 7,107,287 B2
(45) Date of Patent: Sep. 12, 2006

(54) METHOD, SYSTEM AND STORAGE MEDIUM FOR AUTOMATED INDEPENDENT TECHNICAL REVIEW

(75) Inventors: Bruce Gillespie, Richland, WA (US); Dorothy R. Davidson, Broomfield, CO (US); John Fleissner, Arvada, CO (US); D. Edward Gulbransen, Idaho Falls, ID (US); James Seamans, Westminster, CO (US)

(73) Assignee: Canberra Industries, Meriden, CT (US)

(*) Notice: Subject to any disclaimer, the term of this patent is extended or adjusted under 35 U.S.C. 154(b) by 653 days.

(21) Appl. No.: 09/916,388

(22) Filed: Jul. 27, 2001

(65) Prior Publication Data

US 2002/0143796 A1    Oct. 3, 2002

Related U.S. Application Data

(60) Provisional application No. 60/221,438, filed on Jul. 28, 2000, provisional application No. 60/221,018, filed on Jul. 27, 2000.

(51) Int. Cl.
  *G06F 17/30* (2006.01)
  *G01N 23/00* (2006.01)
  *G21F 9/00* (2006.01)

(52) U.S. Cl. .................... 707/200; 436/57; 436/58; 436/59; 588/1

(58) Field of Classification Search ............. 250/394, 250/33.1; 376/153, 159, 170, 209, 435; 435/287, 435/7.9, 29, 6, 7.2, 288.5; 502/242; 976/231; 65/134.3; 75/390; 156/626; 709/309; 719/318; 707/200; 436/57, 58, 59; 588/1
See application file for complete search history.

(56) References Cited

U.S. PATENT DOCUMENTS

| | | | | |
|---|---|---|---|---|
| 4,497,768 A | * | 2/1985 | Caldwell et al. | 376/153 |
| 4,737,234 A | * | 4/1988 | Ruddy | 216/59 |
| 4,777,367 A | * | 10/1988 | Kawasaki et al. | 250/336.1 |
| 5,386,439 A | * | 1/1995 | Leroy et al. | 376/209 |
| 5,410,580 A | * | 4/1995 | Seino | 376/435 |
| 5,894,061 A | * | 4/1999 | Ladouceur | 435/7.9 |
| 5,961,610 A | * | 10/1999 | Kelly et al. | 719/318 |
| 6,145,343 A | * | 11/2000 | Jantzen et al. | 65/134.3 |
| 6,184,030 B1 | * | 2/2001 | Katoot et al. | 435/287.2 |
| 6,269,313 B1 | * | 7/2001 | Givens et al. | 702/22 |
| 6,284,681 B1 | * | 9/2001 | Langton et al. | 442/417 |
| 6,355,857 B1 | * | 3/2002 | Wagner | 588/15 |
| 6,448,564 B1 | * | 9/2002 | Johnson et al. | 250/394 |
| 6,479,427 B1 | * | 11/2002 | Anthony et al. | 502/242 |
| 6,800,452 B1 | * | 10/2004 | McNeil et al. | 435/29 |
| 6,818,188 B1 | * | 11/2004 | Kawasaki et al. | 422/159 |

(Continued)

OTHER PUBLICATIONS

G.K. Becker et al., Mixed Waste Focus Area/Characterization Monitoring Sensor Technology Nondestructive Waste AssayCapability Evalustion, 1998, pp. i-50.*

(Continued)

*Primary Examiner*—Shahid Alam
*Assistant Examiner*—Fred I. Ehichioya
(74) *Attorney, Agent, or Firm*—Cantor Colburn LLP

(57) ABSTRACT

An exemplary embodiment is a method and system for performing an automated independent technical review. The method includes receiving an assay result of a radioactive waste container, determining whether the assay result is within a predetermined parameter, determining whether a review is required if the assay result is not within the predetermined parameter and rejecting the assay result if the review is not required and the assay result is not within the predetermined parameter.

43 Claims, 4 Drawing Sheets

U.S. PATENT DOCUMENTS 6,896,716 B1 * 5/2005 Jones, Jr. .................... 75/396

OTHER PUBLICATIONS

Welsh Terri et al., Total Measurement Uncertainty for Nondestructive Assay of Transuranic Waste at the Waste Receiving and Processing Facility, Feb. 24, 2000, Revision 4, pp. i-52.*

Welsh Terri et al., Total Measurement Uncertainty for Nondestructive Assay of Transuranic Waste at the Waste Receiving and Processing Facility, Initial Release date Mar. 3, 1999 on EDT-623513, Revision 7, pp. i-A-13.*

Smith A. Hastings et al., Design of Satndards for Nondestructive Assay of Special Nuclear MaterialMar., 1997, pp. 1-16.*

US Dept. of Energy, In-Situ Object Counting, Sep. 1999, pp. 1-C8.*

Booth I. et al., PU-238 Assay Performance with the Canberra IQ3 Sytem, Jan. 1997, pp. 1-4.*

Gillespie Bruce et al., Comparison of Variety of Gamma Attenuation Correction Techniques for Different Waste Matrices, Apr. 1993, pp. 1-6.*

Buckley W.M. et al, Full Range MGA Plutonium Isotopic Analysysi Using Single Ge Dtector, Jul. 2000, pp. 1-10.*

Plutonium and Uranium Isotopic Analysis: Recent Developments of the MGA++ Code Suite, Sep. 17, 1999, pp. 1-7.*

Ruhter Wayne D. et al., Quality Management of Gamma-Ray Isotopic Measurements, Nov. 1998, pp. 1-11.*

Clark Delynn et al., Uranium and Plutonium Isotopic Analysis Using MGA++, Jul. 1998, pp. 1-9.*

* cited by examiner

INDEPENDENT TECHNICAL REVIEW REPORT — 302

304 {
ITEM IDENTIFICATION: _____
ITEM DESCRIPTION CODE: _____
DATE AND TIME FOR ASSAY: _____
COUNTER IDENTIFICATION: _____
SEQUENCE NUMBER: _____
}

306 {

| TESTS PERFORMED | RESULTS |
|---|---|
| ITEM DESCRIPTION CODE COMPARISON | OKAY |
| P239/P240 RATIOS | EXPERT REVIEW REQUIRED |
| TRANSMISSION RATE | EXPERT REVIEW REQUIRED |
| . | . |
| . | . |
| . | . |
| . | . |
| . | . |
| . | . |

} 308

310 — FINAL DISPOSITION: EXPERT REVIEW REQUIRED

312 — INDEPENDENT TECHNICAL REVIEWER SIGNATURE

DATE SIGNED
314

*FIG. 3*

EXPERT TECHNICAL REVIEW COMMENT SHEET — 402

404 {
- ITEM IDENTIFICATION: _____
- ITEM DESCRIPTION CODE: _____
- DATE AND TIME FOR ASSAY: _____
- COUNTER IDENTIFICATION: _____
- SEQUENCE NUMBER: _____

406 { DESCRIPTION OF DATA REQUIRING REVIEW:

408 { COMMENTS/DISPOSITION:

410 — TECHNICAL REVIEWER SIGNATURE

DATE SIGNED
412

*FIG. 4*

METHOD, SYSTEM AND STORAGE MEDIUM FOR AUTOMATED INDEPENDENT TECHNICAL REVIEW

CROSS REFERENCE TO RELATED APPLICATIONS

This application claims the benefit of U.S. Provisional Patent Application No. 60/221,438 filed on Jul. 28, 2000, and U.S. Provisional Patent Application No. 60/221,018 filed on Jul. 27, 2000, the entire contents of which are incorporated herein by reference.

BACKGROUND

The management of hazardous waste materials, including radioactive waste, is important to maintaining the environment. Radioactive waste can be defined as any material that contains or is contaminated by radionuclides at concentrations or radioactivity levels greater than a particular level set by the government. This level set by the government is based on a determination of what constitutes an unacceptable level of risk to the environment. In addition, radioactive waste is material that has no foreseen future usefulness. Waste disposal refers to placing the radioactive waste in approved radioactive waste containers, at approved sites, without the intention of retrieval. Making sure that the radioactive waste containers are secure raises special concerns because some nuclear waste materials retain high levels of radioactivity for thousands of years.

There are numerous tools that can be used to monitor the radioactive content of waste being disposed of in the radioactive waste containers. For example, counters are used to measure the radiation of the contents of a radioactive waste container and various other parameters. Typically, the contents are checked to ensure that they meet various regulatory limits as set by the Environmental Protection Agency and the Department of Energy. Another type of check that is done on the counter data is a verification that the testing performed by the counter reflects the actual contents of the radioactive waste container. Both of these types of checks are currently performed manually and are prone to human error. In addition, because of the manual nature of the checking, the process takes a relatively long time and this makes it difficult to process and interpret large volumes of data in a timely fashion.

SUMMARY

An exemplary embodiment is a method and system for performing an automated independent technical review. The method includes receiving an assay result of a radioactive waste container, determining whether the assay result is within a predetermined parameter, determining whether a review is required if the assay result is not within the predetermined parameter and rejecting the assay result if the review is not required and the assay result is not within the predetermined parameter.

BRIEF DESCRIPTION OF THE DRAWINGS

Referring now to the drawings wherein like elements are numbered alike in several FIGURES:

FIG. 3 depicts an exemplary independent technical review template.

FIG. 4 depicts an exemplary expert technical review comment template.

DETAILED DESCRIPTION OF THE INVENTION

Figure 1:
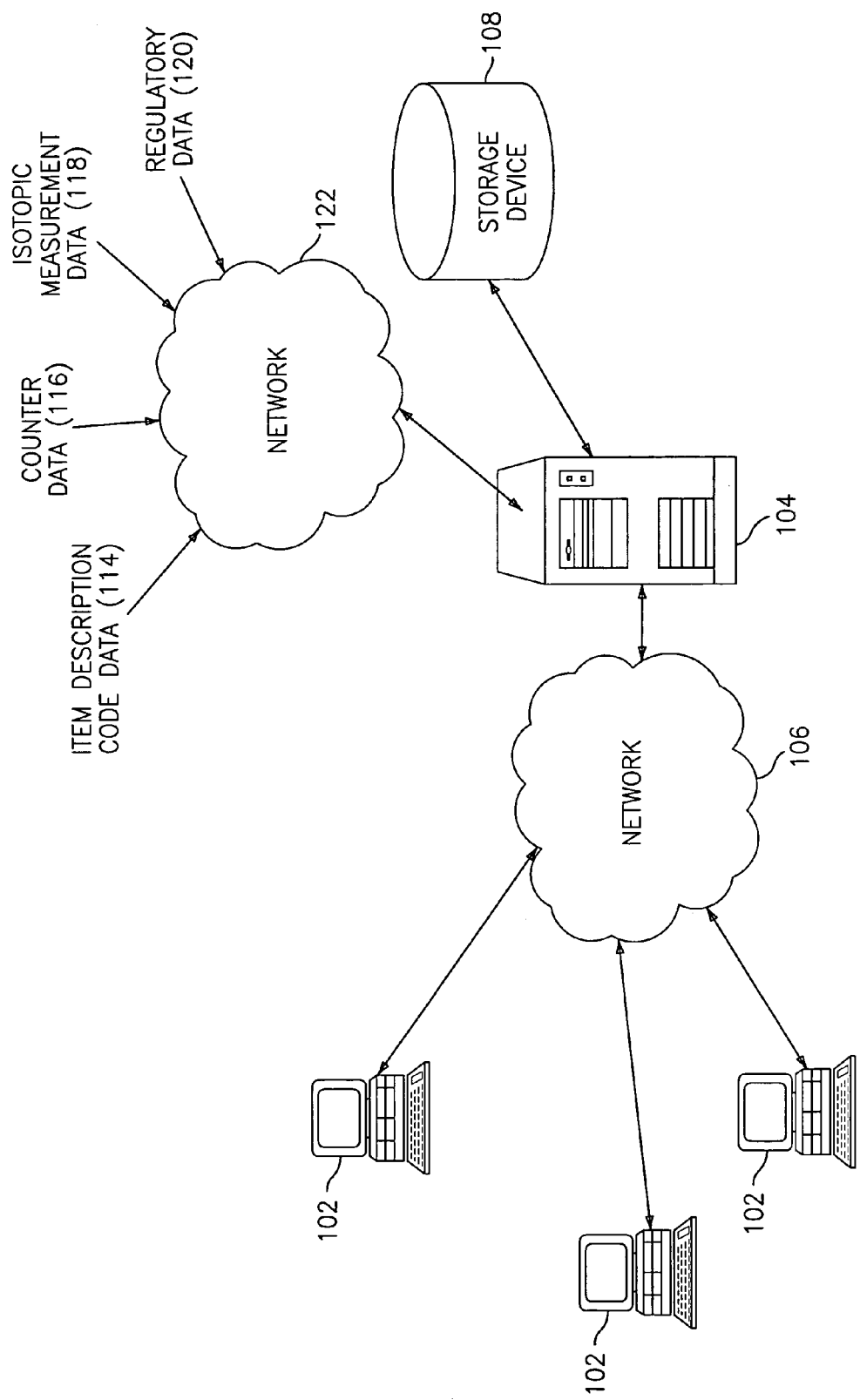
FIG. 1 is a block diagram of an exemplary system for performing an automated independent technical review.

FIG. 1 is a block diagram of an exemplary system for performing an automated independent technical review. The system of FIG. 1 includes user systems 102 through which a waste analyst will contact a host system 104. In a preferred embodiment, the host system 104 executes a program that performs an automated independent technical review. The user systems 102 are coupled to a host system 104 via a network 106. Each user system 102 may be implemented using a general-purpose computer executing a computer program for carrying out the processes described herein. The user systems 102 may be personal computers or host attached terminals. If the user systems 102 are personal computers, the processing described herein may be shared by user system 102 and host system 104 by providing an applet to the user system 102.

Network 106 may be any type of known network including a local area network (LAN), a wide area network (WAN), or a global network (e.g., Internet). The user system 102 may be coupled to the host system 104 through multiple networks (e.g., intranet and Internet) so that not all user systems 102 are coupled to the host system 104 through the same network. One or more of the user systems 102 and the host system 104 may be connected to network 106 in a wireless fashion and network 106 may be a wireless network. In a preferred embodiment, network 106 is an intranet and each user system 102 executes a user interface application (e.g., web browser) to contact the host system 104 through the network 106. Alternatively, a user system 102 may be implemented using a device programmed primarily for accessing network 106 such as WebTV.

FIG. 1 also depicts the sources of data for an automated independent technical review in an exemplary embodiment of the invention. The data can come from a variety of computer systems across the network 122 or the data could come from the storage device 108 attached to the host system 104. In an exemplary embodiment, the data required for an automated independent technical review is identified and subsequently gathered into a single, relational database stored on a storage device 108 connected to the host system 104. The item description code data 114 includes a list of valid materials that can be measured. The counter data 116 includes the assay results or measurement data taken by a counter for a particular radioactive waste container. The isotopic measurement data 118 are either data collected using an isotopic measurement system or default regulatory values if no measurement data are available. The regulatory data 120 includes limits set by the government. This automated independent technical review data can be gathered from locations around the world and then consolidated into a single database stored on a storage device 108 connected to the host system 104. Regulatory data 120, for example, may come from a variety of locations. The automated independent technical review data is gathered in response to a user system 102 request.

The network 122 used to transfer the automated independent technical review data has the same attributes as the network 106 described above and could be the same physical network. This network 122 may be any type of known network including a local area network (LAN), a wide area network (WAN), and a global network (Internet). The automated independent technical review data may be transferred to the host system 104 through multiple networks (e.g., intranet and Internet) so that not all the automated independent technical review data is transferred to the host system 104 through the same network. One or more of the remote systems may be connected to the network 122 in a wireless fashion and network 122 may be a wireless network.

The host system 104 may be implemented using a server operating in response to a computer program stored in a storage medium accessible by the server. The host system 104 may operate as a network server (often referred to as a web server) to communicate with the user systems 102. The host system 104 handles sending and receiving information to and from user systems 102 and can perform associated tasks. The host system 104 may also include a firewall to prevent unauthorized access to the host system 104 and enforce any limitations on authorized access. For instance, an administrator may have access to the entire system and have authority to modify portions of the system. The firewall may be implemented using conventional hardware and/or software as is known in the art.

The host system 104 also operates as an application server. The host system 104 executes one or more computer programs to perform an automated independent technical review. Processing may be shared by the user system 102 and the host system 104 by providing an application (e.g., java applet) to the user system 102. Alternatively, the user system can include a stand-alone software application for performing a portion of the processing described herein. It is understood that separate servers may be used to implement the network server functions and the applications server functions. Alternatively, the network server, the firewall, and the application server can be implemented by a single server executing computer programs to perform the requisite functions.

In an exemplary embodiment of the present invention, the host system 104 contains a suite of application programs that create an automated technical review report. The application programs and a software template are used to create a report that contains assay results, comparison results, and other data regarding a particular radioactive waste container. The comparison results are created using predetermined parameters and data values that can include values stored in data files, values or assay results created by a counter system, and data values calculated by application programs. A comparison test can have three possible results: (1) "assay acceptable" okay to ship the radioactive waste container; (2) "expert review required" before shipping; or (3) "reject" the test results because the data is faulty. If all tests results for a particular container are assay acceptable, then the final disposition on the report will indicate that the assay review is acceptable. If any test result is "expert review required", an independent technical review comment sheet will be generated and the final disposition will indicate that the expert review is required. Expert review is defined as a recommendation for human intervention before shipping the radioactive waste container. A person is advised to review the test results and make a determination of the status of the radioactive waste container if the test result is "expert review required." If any test result indicates a reject, the final disposition will be to reject the assay. If the disposition is reject, generation of an expert technical review comment sheet will be suppressed.

In an exemplary embodiment, one of the applications on the host system 104 performs an item description code comparison to determine if the material in a radioactive waste container can produce acceptable assay results. The application compares an item description code for a particular radioactive waste container with a list that contains the item description codes for the types of materials that can be measured by a particular counter. If the item description code of the radioactive waste container is not found, then the result of the comparison will be "expert review required." Otherwise the output of the comparison is the result "assay acceptable." An example of this would be a gamma counter, that generates a gamma radiation assay result, and a radioactive waste container that contains lead. Here, the result would be "expert review required" because the item description code "lead" would not listed in the gamma counter list of acceptable item description codes. Lead would not be in the list because, in general, lead is too dense to be measured by a gamma counter. Note that one skilled in the art can readily obtain the measurements necessary for use in the tests described herein using commercially available measurement equipment, routine experimentation and/or analysis. Further, one skilled in the art can perform the tests and analyses described herein without involving extensive experimentation.

Another application program, in an exemplary embodiment, takes data from an isotopic measurement system and calculates the ratios of $Pu^{239}$ and $Pu^{240}$. Based on the results of the comparison, the test data is flagged as "assay acceptable" or as "expert review required." The review sheet will print whether the measured isotopics or the default isotopics are being used based on whether the relative error for the $Pu^{240}$ is greater than a selected limit, e.g., 70%. If this condition exists or if no measured isotopics results are available then the report will display that default isotopics are used. In an exemplary embodiment of this application, a weapons grade plutonium test is applied when the default isotopics are not used. In this test, the absolute 3-sigma error for $Pu^{240}$ is calculated. The 3-sigma error is added to and subtracted from the measured weight percent for $Pu^{240}$ to produce a range. If the accepted weapons grade weight percent falls within this range, the result is "assay acceptable." If it falls outside of this range the test result is "expert review required."

In an exemplary embodiment of the present invention, another application on the host system 104 performs comparison of assay result container density data in order to determine if it is within a predetermined parameter. In an exemplary embodiment, the weight and fill height of a radioactive waste container is used to calculate the radioactive waste container density. If the density is above about 2.5 grams per cubic centimeter or below a selected lower limit, the measurement will be deemed not valid and the result "expert review required" will be generated. Otherwise, the result will be "assay acceptable." In an exemplary embodiment, another comparison involves checking for lumps of plutonium in the radioactive waste container because lumps can cause errors in the measurement. This method involves comparison of the Pu mass value calculated from the 129.29 kilo-electron volt ("keV") energy region and the 413.71 keV energy region. If the ratio of the 413.71 keV mass divided by the 129.29 kV mass exceeds the predetermined parameter of about 2.5, then the test result is "expert review required." Otherwise the test result is "assay acceptable."

Another application on the host system, in an exemplary embodiment, performs a criticality safety review. The first part of the application is the qualification range test. This application looks up the amount of plutonium found in the assay result, for a particular radioactive waste container, in a table that contains the acceptable ranges of plutonium mass or a qualification mass value. The program checks to see if the assay result for the radioactive waste container is in the acceptable mass range, and, if the radioactive waste container assay result is not in this range, the comparison result is "reject", otherwise the result is "assay acceptable." The second part of this application performs a comparison of the total plutonium mass as a percent of container net weight. If this value exceeds a customer-specific low qualification mass value, then the assay results are "reject assay." In an exemplary embodiment, the customer-specific low qualification mass value is about 10%. A third part of the criticality safety review is a comparison between the total plutonium equivalent mass measured in a particular radioactive waste container and an acceptable amount for the site as determined by the federal government. If the plutonium equivalent mass is over a certain amount, about 220 grams in an exemplary embodiment, then the measurement is not valid and the result of the comparison is "reject." Otherwise the result of the comparison is "assay acceptable." The fourth part of this criticality safety review application program includes a fissile gram equivalent comparison. This involves converting the mass results of all isotopes identified in a radioactive waste container to fissile equivalent grams of $Pu^{239}$. If this $Pu^{239}$ equivalent mass exceeds a predetermined limit or parameter, then the assay result is "reject." Otherwise, the assay result is "assay acceptable." In an exemplary embodiment this predetermined limit is about 220 grams for a fissile gram equivalent at about 2 sigma.

Additionally, the host system 104 application, in an exemplary embodiment, performs comparisons on nuclide totals to ensure that they are within certain limits. The first part of the application calculates the mass ratio of a first isotope $Pu^{239}$ to a second isotope $Am^{241}$. The nuclide totals results are used to compare the mass of the $Pu^{239}$ to the mass of $Am^{241}$. If the ratio of the $Pu^{239}$ mass to the $Am^{241}$ mass is less than about 200, the result will be "expert review required", otherwise the result is "assay acceptable." The next part of the application analyzes the $Pu^{239}$ mass to $Np^{237}$ mass ratio. The nuclide totals results are used to compare the ratio of the $Pu^{239}$ mass to $Np^{237}$ mass. If the ratio of the $Pu^{239}$ mass to $Np^{237}$ mass is less than about 125, "expert review required" will be the result, otherwise the result is "assay acceptable." In addition, the application program, in an exemplary embodiment, performs additional isotope identification. The nuclide totals results for $Np^{237}$, $U^{233}$, $U^{235}$, and $U^{238}$ are reviewed to identify potentially unidentified nuclides. The main energy lines used to identify these isotopes are listed in the table below.

| Isotope | Peak Energy Used |
|---|---|
| $Np^{237}$ | 311.90 keV |
| $U^{233}$ | 135.30 keV |
| $U^{235}$ | 185.72 keV |
| $U^{238}$ | 1001.03 keV |

If the value of the count rate for any of these isotopes is greater than about 5 times the error, then the test result is "expert review required", otherwise the result is "assay acceptable". If the results of the isotopic measurement data confirms the presence of $Np^{237}$, the $Np^{237}$ nuclide totals result test is not performed. If the results of the isotopic measurement data confirms the presence of $U^{235}$, the $U^{235}$ nuclide totals result test is not performed.

In an exemplary embodiment of the present invention, an application on the host 104 performs a review of segment information in an effort to determine if measurements of individual segments of the drum are valid. Each segment is reviewed for transmission source results. The transmission source peaks with an energy less than about 400 keV are considered the low energy peaks. If the 400 keV transmission source peak intensity is less than about 1 percent of the calibrated intensity, the test result is "expert review required." If a low energy transmission source peak intensity other than the 400 keV peak is less than or equal to about 0.1 percent of its calibrated intensity, the result is "expert review required." Calibrated intensity means the intensity that the peak was at during the transmission calibration.

Another part of the application program looks at pulser/reference source results. These results help determine if the count rates are too high for accurate mass results. Two possible methods are used. Both are outlined here. The first method described uses a reference pulser. This pulser is set at a pre-determined energy and count rate during calibration. During an assay, this energy is checked to find the pulser peak. If the pulser peak is not found, the result will be "expert review required." If the peak is found but the total number of counts in the peak is less than a preset fraction of the initial count rate, "expert review required" will be the result. The second method uses a reference source. This method uses a radioactive source that has a known reference source peak energy. This reference energy peak is searched for and if the source peak is not found, "expert review required" will be the result. If the peak is found, "expert review required" will be the result if the total counts in the source peak is less than about 50% of the calibrated rate. Calibrated rate means the count rate of the source or reference peak determined at the time that the calibration was performed.

Still another portion of the application program that reviews segment information is the live time results. Real time is defined as live time plus dead time. Live time is the time during an assay that the detector is available to process counts. Dead time is the time during which the detector electronics are processing a count and are unavailable to collect counts. The live time results are checked for each segment. If the value of live time divided by real time is less than about 0.3, then "expert review required" will be the result. In an exemplary embodiment, the localized concentrations are also analyzed by this application program. This involves looking at the concentration in the bottom of the radioactive waste container. If the concentration is too high then the result is "expert review required." The bottom two segments are reviewed, and if the total activity, based on the 413.71 keV peak area, in the bottom two segments is greater than about 50% of the total activity in the radioactive waste container, then the result is "expert review required." A segment is an imaginary horizontal disc of the radioactive waste container seen by the detector. In an exemplary embodiment, a segment is between one half an inch and two inches in height.

Storage device 108 may be implemented using a variety of devices for storing electronic information such as a file transfer protocol (FTP) server. It is understood that storage device 108 may be implemented using memory contained in a host system 104 or may be a separate physical device. Storage device 108 contains a variety of information including an automated independent technical review template, the item description code data, and the counter data. Storage device 108 may also contain information concerning the submission of the report request or transmittal of automated independent technical review data (e.g. a user identifier, date and time of submission).

Figure 2:
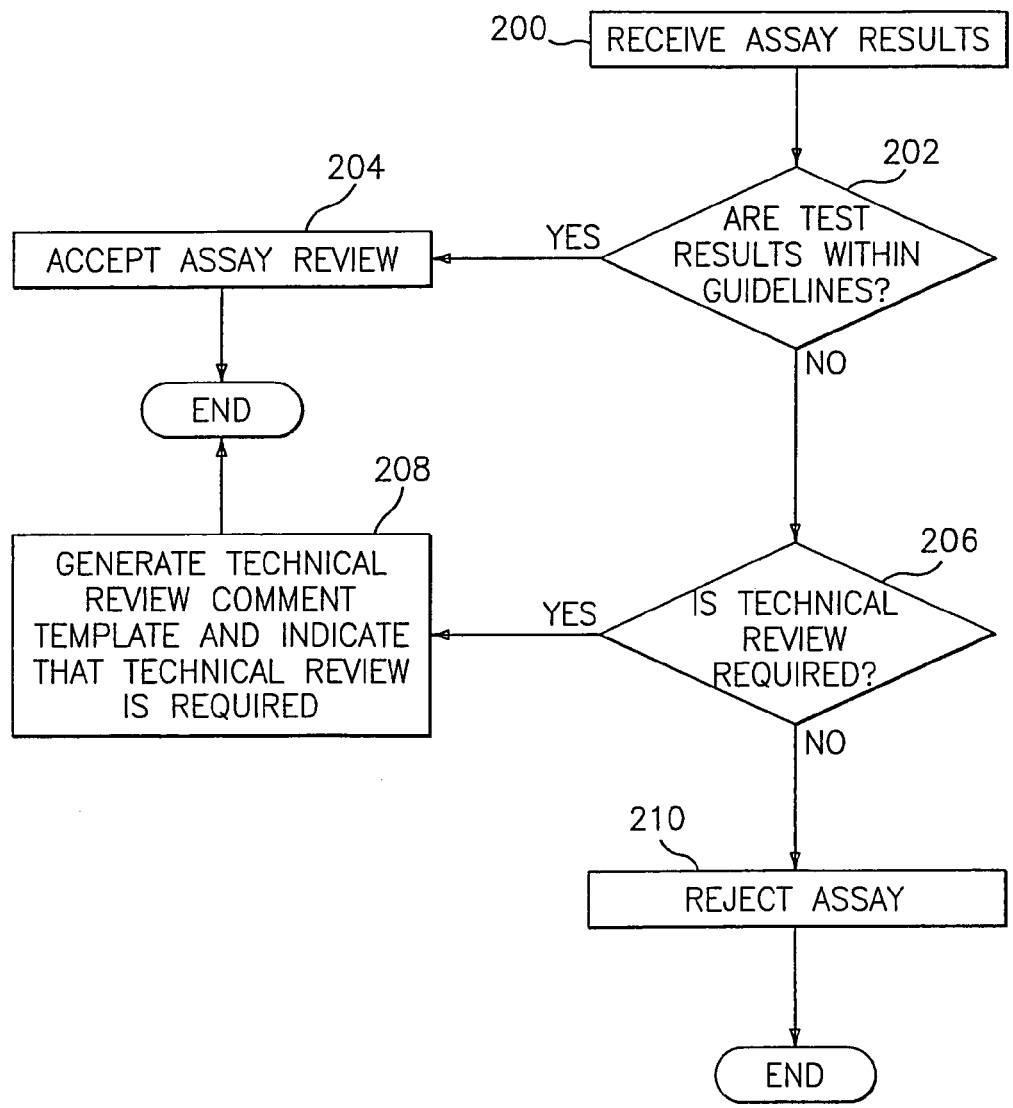
FIG. 2 is a flowchart of an exemplary process for performing an automated independent technical review.

FIG. 2 is a flowchart of an exemplary process for performing an automated independent technical review. At step 200 the assay results are received and at step 202 the assay results are evaluated in order to determine if they are within established guidelines. If the assay results are within the established guidelines, step 204 is performed and the assay review is accepted and the process is completed. If the assay results are not within the established guidelines, step 206 is performed in order to determine if a technical review is required. If a technical is review is required, a technical review comment template that includes the type of technical review to be performed is created at step 208. Once this comment template is created, the process is complete. If a technical review is not required, step 210 is performed and the assay is rejected. After step 210 is performed, the process is complete.

FIG. 3 depicts an exemplary independent technical review template. The review template has a heading "Independent Technical Review Report" 302 in order to identify the report type. Next, the review template contains information 304 that identifies the particular data being tested and referred to in the report. In an exemplary embodiment this includes item identification which is used to identify the assay data package being tested. The identification information 304 also includes an item description code that represents the material that was in the radioactive waste container being tested. The data and time of the assay are also included in order to indicate when the waste package was assayed. A counter identification is used to determine the assay equipment upon which the waste package was counted. The identification information 304 can also include a sequence number which is used as a unique identifier for that particular set of assay data.

The review template also includes a section for describing the tests that were performed 306. The review template in FIG. 3 has some examples of tests that could be performed. Any of the tests described earlier in reference to FIG. 1 could be listed in this section 306. These tests include determining whether an assay result is within a predetermined parameter. Along with a list of the test performed 306, the review template includes a section for the results 308 of the tests. As discussed in reference to FIG. 1 the results could be "assay acceptable", "expert review required", or "reject." Next, the review template contains a space for the final disposition 310 of the test. If all tests for the radioactive waste container are "assay acceptable", then the final disposition 310 will indicate the assay review is acceptable. If any test result is "expert review required", an expert technical review comment sheet, as shown in FIG. 4, will be generated and the final disposition 310 will indicate that technical review is required. If the final disposition 310 is "reject", generation of an expert technical review comment sheet will be suppressed. In an exemplary embodiment the review template also includes a place for the expert technical reviewer to sign 312 and date 314 the report.

FIG. 4 depicts an exemplary expert technical review comment template. The comment template contains a header 402 with the report title, "expert technical review comment sheet." Next, the comment template contains information 404 that identifies the particular data being tested and referred to in the report. In an exemplary embodiment, this information is the same as the data described above in reference to 304 in FIG. 3. Next, the comment template contains a space to describe the data requiring review 406.

This section 406 will contain a list of the tests that resulted in the rating "expert review required." Section 408 of the comment template contains space for comments and disposition information. In an exemplary embodiment, the comment template also includes a place for the expert reviewer to sign 410 and date 412 the report.

As described above, the user system 102 and the host system 104 can share the processing. For example, the user system 102 may include a software application that allows the user system to create a report request without assistance from the host system 104. The user system 102 would then contact the host system 104 to generate the report. Alternatively, the host system 104 may provide an application to the user system 102 (e.g., an applet) once the user system 102 contacts the host system 104. Accordingly, processing can be shared by the two systems.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be evident to those skilled in the art that the present invention provides many improvements over the current state of the art of performing automated independent technical reviews. Using this invention will eliminate human error in the independent review process, create a more consistent review process, create a more reliable review process, and provide a more consistent review process.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method of using a computer processor for automated independent technical review, the method comprising:
   receiving an assay result of a radioactive waste container;
   generating a review template;
   determining whether said assay result is within a predetermined parameter based on said generating said review template, said determining whether said assay result is within a predetermined parameter including comparing a total plutonium mass result to a qualification mass value, the comparing including:

comparing said total plutonium mass result to a low qualification mass value:
    determining that said assay result is not within said predetermined parameter if said total plutonium mass result is less than said low qualification mass;
comparing said total plutonium mass result to a high qualification mass value; and
    determining that said assay result is not within said predetermined parameter if said total plutonium mass result is greater than said high qualification mass value;
determining whether a review is required if said assay result is not within said predetermined parameter;
rejecting said assay result if said review is not required and said assay result is not within said predetermined parameter; and
generating a report indicating that an expert review is required if an item description code for said radioactive waste container is not found within said assay result.

2. The method of claim 1, wherein said assay result is a gamma radiation assay result.

3. The method of claim 1, further including generating a comment template if said review is required.

4. The method of claim 1, wherein said generating said review template includes:
    generating an assay result data field including said assay result;
    generating a requirements field including said predetermined parameter;
    generating a review field including a first instruction based on said determining whether said review is required; and
    generating a rejection field including a second instruction based on said determining whether said review is required.

5. The method of claim 1, further including:
    determining the identity of a material in said radioactive waste container; and
    determining whether said assay result is acceptable based on said identity of said material.

6. The method of claim 1, wherein said determining whether said assay result is within said predetermined parameter includes determining whether a relative error for a plutonium isotope is within said predetermined parameter.

7. The method of claim 6, wherein said determining whether a relative error for a plutonium isotope is within said predetermined parameter includes:
    determining an absolute 3-sigma error for said plutonium isotope;
    determining a range for the weight percent of said plutonium isotope based on said absolute 3-sigma error; and
    determining that said assay result is not within said predetermined parameter if an accepted weapons grade weight percent is not within said range.

8. The method of claim 6, further including using a default isotopic if no measurement for said plutonium isotope is available.

9. The method of claim 6, wherein said determining whether said relative error for said plutonium isotope is within said predetermined parameter includes using a default isotopic parameter if said relative error is greater than about 70 percent.

10. The method of claim 9, wherein said relative error is based on a plutonium isotope for $Pu^{240}$.

11. The method of claim 1, wherein said determining whether said assay result is within said predetermined parameter further includes determining whether the density of said radioactive waste container is within said predetermined parameter.

12. The method of claim 11, wherein said determining whether said density of said radioactive waste container is within said predetermined parameter includes determining that said assay result is not within said predetermined parameter if said density is greater than about 2.5 grams per cubic centimeter.

13. The method of claim 11, wherein said determining whether said density of said radioactive waste container is within said predetermined parameter includes determining that said assay result is not within said predetermined parameter if said density is less than a preselected limit.

14. The method of claim 1, wherein said determining whether said assay result is within said predetermined parameter further includes determining whether a radioactive material in said radioactive waste container is lumped.

15. The method of claim 14, wherein said determining whether said radioactive material in said radioactive waste container is lumped includes comparing the mass ratio of two gamma energies.

16. The method of claim 15, wherein said comparing the ratio of said two gamma energies includes:
    determining the mass ratio of a 413.71 keV gamma energy to a 129.294 keV gamma energy;
    determining that said assay result is not within said predetermined parameter if said ratio is greater than about 2.5.

17. The method of claim 1, wherein said determining whether said assay result is within said predetermined parameter further includes determining that said assay result is not within said predetermined parameter if a total plutonium weight percent is greater than about 10 percent.

18. The method of claim 1, wherein said determining whether said assay result is within said predetermined parameter further includes determining that said assay result is not within said predetermined parameter if a criticality safety value is greater than about 220 grams.

19. The method of claim 1, wherein said determining whether said assay result is within said predetermined parameter further includes determining that said assay result is not within said predetermined parameter if a fissile gram equivalent at 2 sigma is greater than about 220 grams.

20. The method of claim 1, wherein said determining whether said assay result is within said predetermined parameter further includes using a nuclide total result to compare a mass ratio of a first isotope and a second isotope.

21. The method of claim 20 wherein said first isotope is $Pu^{239}$ and said second isotope is $Am^{241}$.

22. The method of claim 21 wherein said using a nuclide total result to compare said mass ratio of a first isotope and a second isotope includes determining that said assay result is not within said predetermined parameter if said mass ratio is less than about 200.

23. The method of claim 20 wherein said first isotope is $Pu^{239}$ and said second isotope is $Np^{237}$.

24. The method of claim 23 wherein said using a nuclide total result to compare said mass ratio of a first isotope and a second isotope includes determining that said assay result is not within said predetermined parameter if said mass ratio is less than about 125.

25. The method of claim 1, wherein said determining whether said assay result is within said predetermined parameter further includes determining a nuclide totals result for an isotope.

26. The method of claim 25, wherein said isotope is $Np^{237}$.

27. The method of claim 26, wherein said determining said nuclide totals result is not performed for said isotope if the presence of said isotope is confirmed.

28. The method of claim 25, wherein said isotope is $U^{235}$.

29. The method of claim 28, wherein said determining said nuclide totals result is not performed for said isotope if the presence of said isotope is confirmed.

30. The method of claim 25, wherein said isotope is $U^{233}$.

31. The method of claim 25, wherein said isotope is $U^{238}$.

32. The method of claim 25, wherein said determining whether said assay result is within said predetermined parameter further includes determining that said assay result is not within said predetermined parameter if a count rate corresponding to said isotope is greater than about 5 times an error value.

33. The method of claim 1, wherein said determining whether said assay result is within said predetermined parameter further includes determining that said assay result is not within said predetermined parameter if a 400 keV transmission source peak intensity is less than about 1 percent of a calibrated intensity.

34. The method of claim 1, wherein said determining whether said assay result is within said predetermined parameter further includes:
   defining a segment of said radioactive waste container;
   determining whether a transmission source peak for said segment of said radioactive waste container is a low transmission source peak having an energy of less than about 400 keV; and
   determining that said assay result is within said predetermined parameter if said low transmission source peak is greater than about 0.1 percent of a calibrated intensity.

35. The method of claim 1, wherein said determining whether said assay result is within said predetermined parameter further includes:
   detecting the presence of a pulser peak;
   determining that said assay result is not within said predetermined parameter if said pulser peak is not detected; and
   determining that said assay result is not within said predetermined parameter if a total number of counts in said pulser peak is less than a preset fraction of an initial count rate.

36. The method of claim 1, wherein said determining whether said assay result is within said predetermined parameter further includes:
   detecting the presence of a reference source peak;
   determining that said assay result is not within said predetermined parameter if said reference source peak is not detected; and
   determining that said assay result is not within said predetermined parameter if a total number of counts in said reference source peak is less than about 50 percent of a calibrated rate.

37. The method of claim 1, wherein said determining whether said assay result is within said predetermined parameter further includes:
   defining a segment of said radioactive waste container;
   determining a live time result for said segment;
   determining a real time result for said segment; and
   determining that said assay result is not within said predetermined parameter if said live time result divided by said real time result is less than about 0.3.

38. The method of claim 1, wherein said determining whether said assay result is within said predetermined parameter further includes:
   defining a first segment and a second segment of said radioactive waste container;
   detecting a first radioactivity level of said first segment;
   detecting a second radioactivity level of said second segment;
   detecting a total radioactivity level of said radioactive waste container; and
   determining that said assay result is not within said predetermined parameter if said first radioactivity level and said second radioactivity level combined is greater than about 50 percent of said total radioactivity level.

39. The method of claim 38, wherein said first segment is at a bottom end of said radioactive waste container.

40. The method of claim 39, wherein said first segment is disposed against said second segment.

41. A system for automated independent technical review, the system comprising:
   a host system for receiving an assay result of a radioactive waste container, generating a review template, determining whether said assay result is within a predetermined parameter based on said generating said review template, determining whether a review is required if said assay result is not within said predetermined parameter, rejecting said assay result if said review is not required and said assay result is not within said predetermined parameter, and generating a report indicating that an expert review is required if an item description code for said radioactive waste container is not found within said assay result; wherein said determining whether said assay result is within a predetermined parameter includes comparing a total plutonium mass result to a qualification mass value, the comparing including: comparing said total plutonium mass result to a low qualification mass value; determining that said assay result is not within said predetermined parameter if said total plutonium mass result is less than said low qualification mass; comparing said total plutonium mass result to a high qualification mass value; and determining that said assay result is not within said predetermined parameter if said total plutonium mass result is greater than said high qualification mass value;
   a network coupled to said host system; and
   a database coupled to said host system for storing data relating to said automated independent technical review.

42. The system of claim 41, further including:
   a user system coupled to said network; and
   said user system accessing said host system via said network.

43. A computer-readable storage medium encoded with machine-readable computer program code for automated independent technical review, the storage medium including instructions for causing a processor to implement a method comprising:
   receiving an assay result of a radioactive waste container;
   generating a review template;
   determining whether said assay result is within a predetermined parameter based on said generating said review template, said determining whether said assay result is within a predetermined parameter including comparing a total plutonium mass result to a qualification mass value, the comparing including:

comparing said total plutonium mass result to a low qualification mass value;

determining that said assay result is not within said predetermined parameter if said total plutonium mass result is less than said low qualification mass;

comparing said total plutonium mass result to a high qualification mass value; and determining that said assay result is not within said predetermined parameter if said total plutonium mass result is greater than said high qualification mass value;

determining whether a review is required if said assay result is not within said predetermined parameter;

rejecting said assay result if said review is not required and said assay result is not within said predetermined parameter; and generating a report indicating that an expert review is required if an item description code for said radioactive waste container is not found within said assay result.

* * * * *